(12) United States Patent
Pandey

(10) Patent No.: US 11,755,389 B2
(45) Date of Patent: Sep. 12, 2023

(54) MESSAGE PROCESSING METHOD AND MESSAGE PROCESSING DEVICE

(71) Applicant: Rohde & Schwarz GmbH & Co. KG, Munich (DE)

(72) Inventor: Anil Pandey, Hampshire (GB)

(73) Assignee: Rohde & Schwarz GmbH & Co. KG, Munich (DE)

( * ) Notice: Subject to any disclaimer, the term of this patent is extended or adjusted under 35 U.S.C. 154(b) by 799 days.

(21) Appl. No.: 16/594,896

(22) Filed: Oct. 7, 2019

(65) Prior Publication Data

US 2021/0103485 A1 Apr. 8, 2021

(51) Int. Cl.
*H04L 12/803* (2013.01)
*G06F 9/54* (2006.01)
*H04L 9/32* (2006.01)
*H04W 76/00* (2018.01)

(52) U.S. Cl.
CPC ............ *G06F 9/546* (2013.01); *H04L 9/3242* (2013.01); *H04W 76/00* (2013.01)

(58) Field of Classification Search
CPC ....... H04W 76/00; H04L 9/3242; G06F 9/546

USPC .......................................................... 370/310
See application file for complete search history.

(56) References Cited

U.S. PATENT DOCUMENTS

| 8,532,614 B2 * | 9/2013 | Somasundaram .... H04W 12/10 455/410 |
| 2019/0116520 A1* | 4/2019 | Chaponniere ........... H04W 4/20 |
| 2019/0349764 A1* | 11/2019 | Suh ..................... H04L 63/0892 |

FOREIGN PATENT DOCUMENTS

| WO | 2018008922 A3 | 8/2018 | |
| WO | 2018206501 A1 | 11/2018 | |
| WO | WO-2019139903 A1 * | 7/2019 | ............ H04W 48/16 |

* cited by examiner

*Primary Examiner* — Christopher M Crutchfield
*Assistant Examiner* — Jean F Voltaire
(74) *Attorney, Agent, or Firm* — DITTHAVONG, STEINER & MLOTKOWSKI

(57) ABSTRACT

A message processing method is provided. The message processing method comprises the steps of receiving a message, checking the value of an extended protocol discriminator of the message. If the value of the extended protocol discriminator corresponds to a special extended protocol discriminator, the method includes modifying the special extended protocol discriminator to a regular extended protocol discriminator.

17 Claims, 4 Drawing Sheets

MESSAGE PROCESSING METHOD AND MESSAGE PROCESSING DEVICE

TECHNICAL FIELD

The invention relates to a message processing method and a message processing device.

BACKGROUND ART

Generally, in times of an increasing number of applications providing communication capabilities, there is a growing need of a message processing method and a message processing device in order to ensure a highly efficient communication. In this context, for instance, it would be highly advantageous to reuse existing network functions to process non-access stratum (NAS) messages that are especially designed by overloading the respective protocol discriminator mechanism.

WO 2018/008922 A2 relates to a method for supporting NAS signaling to a user equipment (UE) by a base station in a wireless communication system, the method comprising the steps of: transmitting, to the UE, information for supporting a connection to a next generation (NG) core; receiving an NAS-related message from the UE; performing one of MME selection and AMF selection according to whether the NAS-related message includes information regarding the use of NAS; and transmitting an NAS message to an MME or an AMF which is determined as a result of performing one of the MME selection and the AMF selection. Disadvantageously, said method for supporting NAS signaling does not allow reusing existing network functions in the sense mentioned above.

Accordingly, there is a need to provide a message processing method and a message processing device, which do not only provide a high efficiency but also allow reusing existing network functions to process NAS messages that are especially designed by overloading the respective protocol discriminator mechanism.

SUMMARY OF THE INVENTION

According to a first aspect of the invention, a message processing method is provided. The message processing method comprises the steps of receiving a message, checking the value of an extended protocol discriminator of the message, and if the value of the extended protocol discriminator corresponds to a special extended protocol discriminator, modifying the special extended protocol discriminator to a regular extended protocol discriminator. Advantageously, complexity can be reduced, thereby ensuring a high efficiency.

According to a first implementation form of the first aspect of the invention, the message comprises or is a non-access stratum message. Advantageously, for instance, existing network functions can be reused to process non-access stratum messages that are especially designed by overloading the respective protocol discriminator mechanism.

According to a second implementation form of the first aspect of the invention, the extended protocol discriminator comprises or is a protocol discriminator.

Advantageously, for example, flexibility can be increased, which leads to an increased efficiency.

According to a further implementation form of the first aspect of the invention, the special extended protocol discriminator comprises or is a different set of values. Additionally or alternatively, the regular extended protocol discriminator comprises or is a set of certain extended protocol discriminator values. Advantageously, for instance, complexity can further be reduced, which leads to an increased efficiency.

According to a further implementation form of the first aspect of the invention, the message processing method further comprises the step of handling the message, preferably a non-access stratum message, like a regular message, preferably a regular non-access stratum message, if the extended protocol discriminator corresponds to a regular extended protocol discriminator. Advantageously, for example, inefficiency can further be reduced.

According to a further implementation form of the first aspect of the invention, modifying the special extended protocol discriminator comprises mapping from one value to another preferably by applying fixed mapping. Advantageously, for instance, efficiency can further be increased by reducing complexity.

According to a further implementation form of the first aspect of the invention, the message processing method further comprises the step of adding a security header type. Advantageously, for example, inefficiency can further be reduced.

According to a further implementation form of the first aspect of the invention, the message processing method further comprises the step of adding a spare half octet preferably from a security header type, more preferably form a not transmitted security header type. Advantageously, for instance, efficiency can further be increased.

According to a further implementation form of the first aspect of the invention, the message processing method further comprises the step of adding a message type, preferably a control plane service request. Advantageously, for example, efficacy can further be increased.

According to a further implementation form of the first aspect of the invention, the message processing method further comprises the step of processing a resulting message, preferably a resulting non-access stratum message, like a regular extended protocol discriminator message. Advantageously, for instance, complexity can further be reduced.

According to a further implementation form of the first aspect of the invention, the processing of the resulting message, preferably the resulting non-access stratum message, is performed in the respective core network. Advantageously, for example, inefficiency can further be reduced.

According to a further implementation form of the first aspect of the invention, the message processing method further comprises the step of adding any other missing field being relevant for the regular extended protocol discriminator. Advantageously, for instance, flexibility can further be increased, thereby also increasing efficiency.

According to a further implementation form of the first aspect of the invention, for a certain value of the special extended protocol discriminator, a certain security type is applied and/or for another value a different or the same security type is applied. Advantageously, for example, complexity can further be reduced.

According to a further implementation form of the first aspect of the invention, the security header type is four bits long. Advantageously, for instance, efficacy can further be increased.

According to a further implementation form of the first aspect of the invention, the special extended protocol discriminator does not contain the security header type. Advantageously, for example, inefficiency can further be reduced.

According to a further implementation form of the first aspect of the invention, the spare half octet comprises or is a fixed field existing to create byte alignment. Advantageously, for instance, efficiency can further be increased by reducing complexity.

According to a further implementation form of the first aspect of the invention, adding a message type, preferably a control plane service request, comprises mapping each special extended protocol discriminator to a certain message type, preferably to a certain control plane service request. Advantageously, for example, complexity can further be reduced, which leads to an increased efficiency.

According to a further implementation form of the first aspect of the invention, adding any other missing field being relevant for the regular extended protocol discriminator comprises mapping other fields of the respective message to predetermined values. Advantageously, for instance, efficiency can further be increased.

According to a second aspect of the invention, a message processing device is provided. The message processing device comprises a receiver, and a controller connected to the receiver. In this context, the receiver is configured to receive a message and the controller is configured to check the value of an extended protocol discriminator of the message. In addition to this, the controller is further configured to modify the special extended protocol discriminator to a regular extended protocol discriminator if the value of the extended protocol discriminator corresponds to a special extended protocol discriminator. Advantageously, complexity can be reduced, thereby ensuring a high efficiency.

According to a first implementation form of the second aspect of the invention, the message comprises or is a non-access stratum message. Advantageously, for instance, existing network functions can be reused to process non-access stratum messages that are especially designed by overloading the respective protocol discriminator mechanism.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
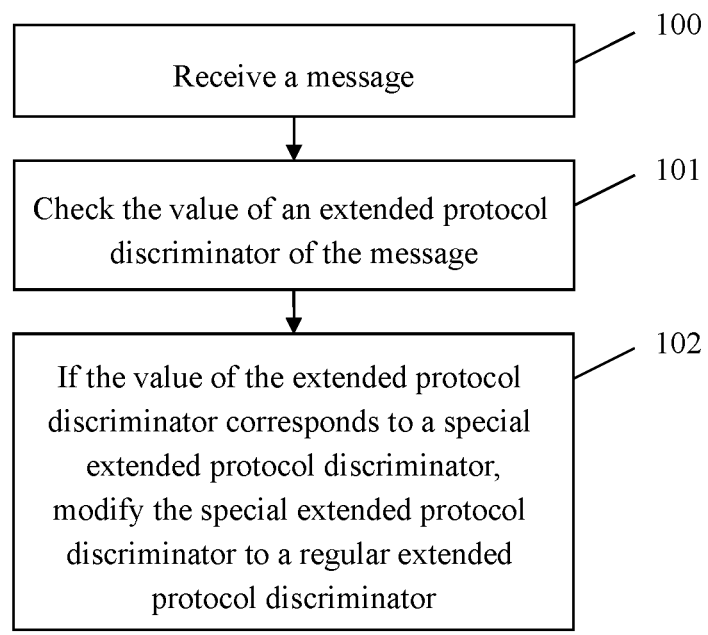
FIG. 1 shows a flow chart of an exemplary embodiment of the first aspect of the invention.

Firstly, FIG. 1 shows a flow chart of an exemplary embodiment of the inventive message processing method. In a first step 100, a message is received. Then, in a second step 101, the value of an extended protocol discriminator of the message is checked. Furthermore, in a third step 102, if the value of the extended protocol discriminator corresponds to a special extended protocol discriminator, the special extended protocol discriminator is modified to a regular extended protocol discriminator.

In this context, it might be particularly advantageous if the message comprises or is a non-access stratum message. With respect to the extended protocol discriminator, it is noted that the extended protocol discriminator may especially comprise or be a protocol discriminator.

Furthermore, the special extended protocol discriminator may especially comprise or be a different set of values. In addition to this or as an alternative, the regular extended protocol discriminator may especially comprise or be a set of certain extended protocol discriminator values.

Figure 2:
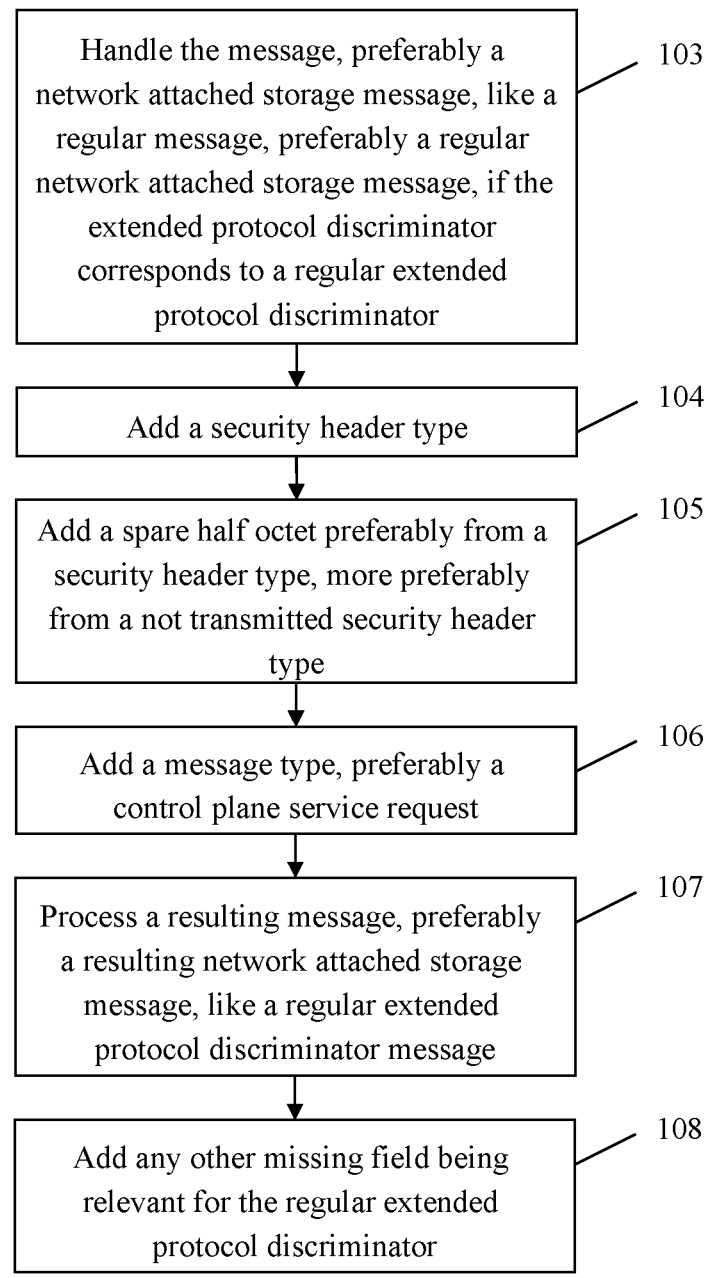
FIG. 2 shows a flow chart of a further exemplary embodiment of the first aspect of the invention.

Moreover, in accordance with step 103 of FIG. 2, the message processing method may further comprise the step of handling the message, preferably a non-access stratum message, like a regular message, preferably a regular non-access stratum message, if the extended protocol discriminator corresponds to a regular extended protocol discriminator. It is further noted that modifying the special extended protocol discriminator may especially comprise mapping from one value to another preferably by applying fixed mapping.

According to step 104 of FIG. 2, the message processing method may further comprise the step of adding a security header type. It is noted that this may preferably be performed for the case that the value of the extended protocol discriminator corresponds to a special extended protocol discriminator.

In accordance with step 105 of FIG. 2, the message processing method may further comprise the step of adding a spare half octet preferably from a security header type, more preferably from a not transmitted security header type.

It is noted that this may preferably be performed for the case that the value of the extended protocol discriminator corresponds to a special extended protocol discriminator.

Moreover, according to step 106 of FIG. 2, the message processing method may further comprise the step of adding a message type, preferably a control plane service request. It is noted that this may preferably be performed for the case that the value of the extended protocol discriminator corresponds to a special extended protocol discriminator.

Furthermore, according to step 107 of FIG. 2, the message processing method may further comprise the step of processing a resulting message, preferably a resulting non-access stratum message, like a regular extended protocol discriminator message. In this context, the processing of the resulting message, preferably the resulting non-access stratum message, may especially be performed in the respective core network.

It is further noted that in accordance with step 108 of FIG. 2, the message processing method may further comprise the step of adding any other missing field being relevant for the regular extended protocol discriminator. It is noted that this may preferably be performed for the case that the value of the extended protocol discriminator corresponds to a special extended protocol discriminator.

It might be particularly advantageous if for a certain value of the special extended protocol discriminator, a certain security type is applied and/or for another value a different or the same security type is applied. With respect to the above-mentioned security header type, it is noted that the security header type may preferably be four bits long.

It is further noted that it might be particularly advantageous if the special extended protocol discriminator does not contain the security header type. With respect to the spare half octet, it is noted that the spare half octet may especially comprise or be a fixed field existing to create byte alignment.

Furthermore, adding a message type, preferably a control plane service request, may especially comprise mapping each special extended protocol discriminator to a certain message type, preferably to a certain control plane service request. Moreover, adding any other missing field being relevant for the regular extended protocol discriminator may especially comprise mapping other fields of the respective message to predetermined values.

Now, before FIG. 3 will be explained in detail, some additional background information is discussed in the following:

It is noted that a typical non-access stratum (NAS) message especially according to the new radio standard preferably comprises an extended protocol discriminator being typically one octet long, a security header type being typically a half octet long, a spare half octet being a half octet long as the term already reveals, and a message type being typically one octet long.

In this context, for instance, the Internet of Things (IoT) enables various use cases and is typically achieved by using low power devices that have non-rechargeable batteries. In order to prolong the lifetime of such devices, the power consumption is required to be minimized. Protocol layers can help reduce the power consumption by minimizing the message size.

Furthermore, in order to save some octets on the air interface for such improvements, it is possible to overload the meaning of the extended protocol discriminator (EPD). Therefore, for example, a new unused value of the EPD could be used, which especially assumes a certain security header type, and a certain message type.

In other words, with the aid of said overloading, the respective NAS message especially comprising a kind of special EPD requires two octets less.

However, while said overloading saves two octets and is a significant improvement for a device requiring very long battery life, exemplarily about between ten and twenty years, it causes an overhead for the network to process such a message.

In this context, it is noted that the network currently has network functions, preferably existing network functions, which are especially activated based on the protocol discriminator, preferably the extended protocol discriminator, and the message type. These functions cannot be used as such, as the new message proposed above has a different EPD, preferably a special EPD, and does not carry the message type. Additionally, it also assumes a security header type.

Accordingly, it is the great advantage of the invention that after the missing field or the missing fields, respectively, have been added, the message can be processed like a regular message. Hence, the adaptation of the receiver to be able to handle the shorter messages is very little.

Figure 3:
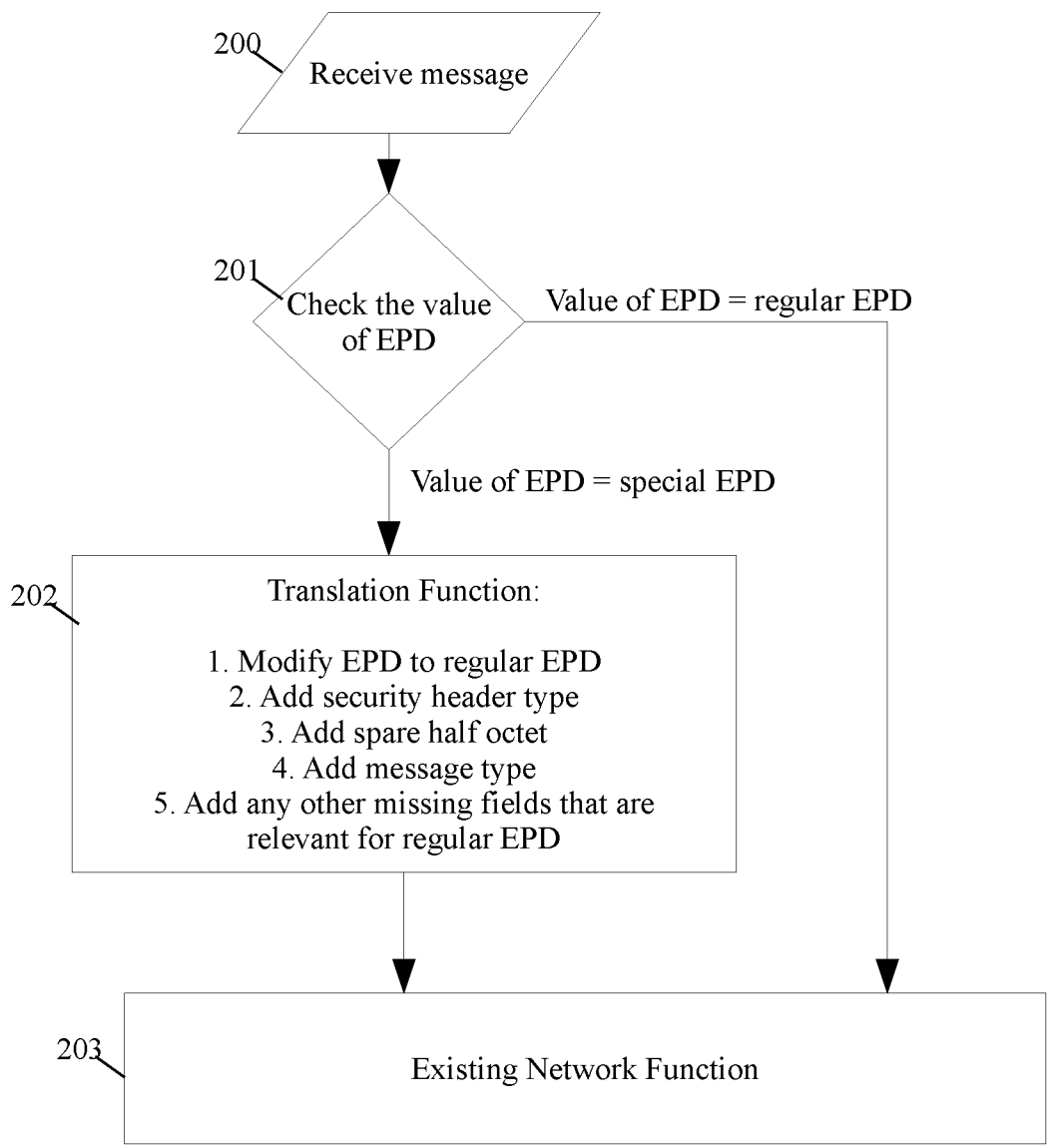
FIG. 3 shows a flow chart of a further exemplary embodiment of the first aspect of the invention with special respect to a translation function comprising some of the steps of FIG. 1 and FIG. 2.

FIG. 3 illustrates a flow chart of a further exemplary embodiment of the first aspect of the invention with special respect to a translation function comprising some of the steps of FIG. 1 and FIG. 2.

According to FIG. 3, in a first step 200, a message is received. Then, in a second step 201 of FIG. 3, with respect to said message, the value of the respective extended protocol discriminator (EPD) is checked. Furthermore, in the case that the value of the EPD corresponds to a regular EPD, an existing network function is performed in accordance with step 203 of FIG. 3.

Moreover, in the case that the value of the EPD corresponds to a special EPD, before said existing network function of step 203 is performed, a translation function according to step 202 is performed.

In accordance with step 202, said translation function comprises the following steps: modifying the EPD to a regular EPD, adding a security header type, adding a spare half octet, adding a message type, and adding any other missing fields that are relevant for the respective regular EPD.

In other words, the above-mentioned translation function can translate a message, especially a non-access stratum message, with special values of extended protocol discriminator into a regular value of extended protocol discriminator and a regular structure of message such that it can be processed by an existing network function without any modifications.

Figure 4:
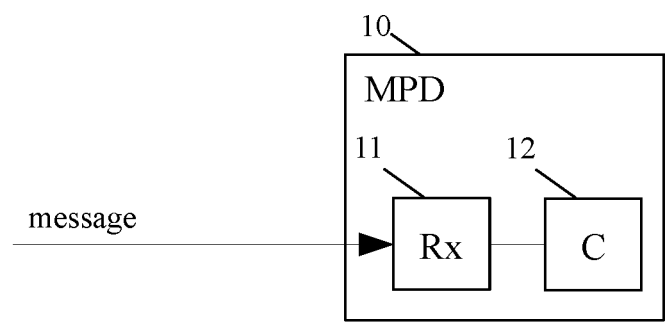
FIG. 4 shows an exemplary embodiment of the second aspect of the invention.

Finally, FIG. 4 illustrates an exemplary embodiment of the inventive message processing device 10. Said message processing device 10 comprises a receiver 11, and a controller 12 connected to the receiver 11. In this context, the receiver 11 receives a message and the controller 12 checks the value of an extended protocol discriminator of the message.

In addition to this, the controller 12 modifies the special extended protocol discriminator to a regular extended protocol discriminator if the value of the extended protocol discriminator corresponds to a special extended protocol discriminator.

It is noted that it might be particularly advantageous if the message comprises or is a non-access stratum message. It is further noted that the extended protocol discriminator may preferably comprise or be a protocol discriminator.

Moreover, the special extended protocol discriminator may especially comprise or be a different set of values. In addition to this or as an alternative, the regular extended protocol discriminator may especially comprise or be a set of certain extended protocol discriminator values.

Furthermore, the controller 12 of the message processing device 10 may especially handle the message, preferably a non-access stratum message, like a regular message, preferably a regular non-access stratum message, if the extended protocol discriminator corresponds to a regular extended protocol discriminator.

With respect to the above-mentioned modifying, it is noted that modifying the special extended protocol discriminator comprises mapping from one value to another preferably by applying fixed mapping. In other words, the controller 12 may especially map from one value to another preferably by applying fixed mapping.

In addition to this or as an alternative, the controller 12 of the message processing device 10 may especially add a security header type. It is noted that this may preferably be performed for the case that the value of the extended protocol discriminator corresponds to a special extended protocol discriminator.

Additionally or alternatively, the controller 12 may especially add a spare half octet preferably from a security header type, more preferably from a not transmitted security header type. It is noted that this may preferably be performed for the case that the value of the extended protocol discriminator corresponds to a special extended protocol discriminator.

Further additionally or further alternatively, the controller 12 may especially add a message type, preferably a control plane service request. It is noted that this may preferably be performed for the case that the value of the extended protocol discriminator corresponds to a special extended protocol discriminator.

Furthermore, the controller 12 of the message processing device 10 may especially process a resulting message, preferably a resulting non-access stratum message, like a regular extended protocol discriminator message.

In this context, it might be particularly advantageous if the processing of the resulting message, preferably the resulting non-access stratum message, is performed in the respective core network.

Moreover, the controller 12 may especially add any other missing field being relevant for the regular extended protocol discriminator. It is noted that this may preferably be performed for the case that the value of the extended protocol discriminator corresponds to a special extended protocol discriminator.

It is noted that it might be particularly advantageous if for a certain value of the special extended protocol discriminator, a certain security type is applied and/or for another value a different or the same security type is applied. With respect to the above-mentioned security header type, it is noted that the security header type may preferably be four bits long.

It is particularly advantageous if the special extended protocol discriminator does not contain the security header type. With respect to the above-mentioned spare half octet, it is noted that the spare half octet may preferably comprise or be a fixed field existing to create byte alignment.

It is further noted that adding a message type, preferably a control plane service request, may especially comprise mapping each special extended protocol discriminator to a certain message type, preferably to a certain control plane service request. In other words, the controller 12 may especially map each special extended protocol discriminator to a certain message type, preferably to a certain control plane service request.

In addition to this or as an alternative, it is noted that adding any other missing field being relevant for the regular extended protocol discriminator may especially comprise mapping other fields of the respective message to predetermined values. In other words, the controller 12 of the message processing device 10 may especially map other fields of the respective message to predetermined values.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of serveral implementations, such feature may be combined with one or more other features of the other implementations as may be desired and advantageous for any given or particular application.

What is claimed is:

1. A message processing method comprising the steps of:
   receiving a message,
   checking the value of an extended protocol discriminator of the message,
   if the value of the extended protocol discriminator corresponds to a special extended protocol discriminator, before an existing network function is performed, performing a translation function, said translation function comprising the steps of:
      modifying the special extended protocol discriminator to a regular extended protocol discriminator,
      adding a security header type,
      adding a spare half octet,
      adding a message type, and
      adding any other missing field being relevant for the regular extended protocol discriminator.

2. The message processing method according to claim 1, wherein the message comprises or is a non-access stratum message.

3. The message processing method according to claim 1, wherein the extended protocol discriminator comprises or is a protocol discriminator.

4. The message processing method according to claim 1,
   wherein the special extended protocol discriminator comprises or is a different set of values, and/or
   wherein the regular extended protocol discriminator comprises or is a set of certain extended protocol discriminator values.

5. The message processing method according to claim 1, wherein the message processing method further comprises the step of handling the message as a regular message if the extended protocol discriminator corresponds to a regular extended protocol discriminator.

6. The message processing method according to claim 1, wherein modifying the special extended protocol discriminator comprises mapping from one value to another.

7. The message processing method according to claim 1, wherein the message processing method further comprises the step of adding a message type.

8. The message processing method according to claim 1, wherein the message processing method further comprises the step of processing a resulting message as a regular extended protocol discriminator message.

9. The message processing method according to claim 8, wherein the processing of the resulting message is performed in the respective core network.

10. The message processing method according to claim 1, wherein for a certain value of the special extended protocol discriminator, a certain security type is applied and/or for another value a different or the same security type is applied.

11. The message processing method according to claim 1, wherein the security header type is four bits long.

12. The message processing method according to claim 1, wherein the special extended protocol discriminator does not contain the security header type.

13. The message processing method according to claim 1, wherein the spare half octet comprises or is a fixed field existing to create byte alignment.

14. The message processing method according to claim 1, wherein adding a message type comprises mapping each special extended protocol discriminator to a certain message type.

15. The message processing method according to claim 1, wherein adding any other missing field being relevant for the regular extended protocol discriminator comprises mapping other fields of the respective message to predetermined values.

16. A message processing device comprising:
   a receiver, and
   a controller connected to the receiver,
   wherein the receiver is configured to receive a message, wherein the controller is configured to
　check the value of an extended protocol discriminator of the message,
　wherein if the value of the extended protocol discriminator corresponds to a special extended protocol discriminator, before an existing network function is performed, the controller is further configured to perform a translation function, said translation function comprising the steps of:
　modifying the special extended protocol discriminator to a regular extended protocol discriminator,
　adding a security header type,
　adding a spare half octet,
　adding a message type, and
　adding any other missing field being relevant for the regular extended protocol discriminator.

17. The message processing device according to claim 16, wherein the message comprises or is a non-access stratum message.

* * * * *